W. REID, R. H. REID AND W. REID, Jr.
RESILIENT TIRE FOR WHEELS.
APPLICATION FILED MAR. 23, 1921.

1,404,059.

Patented Jan. 17, 1922.

2 SHEETS—SHEET 1.

INVENTORS
WILLIAM REID
ROBERT HARKNESS REID
WILLIAM REID, JR.
BY Howson and Howson
ATT'YS

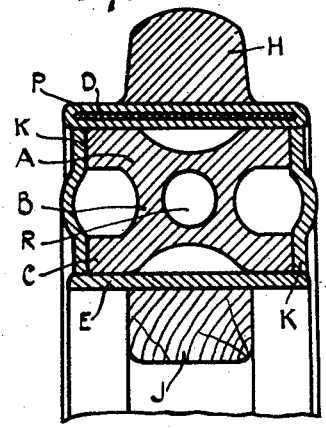
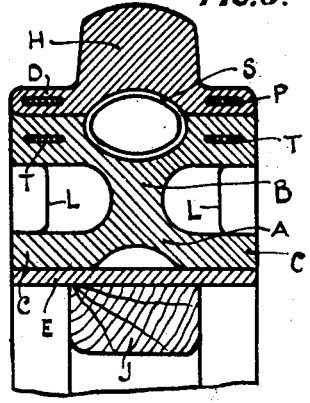
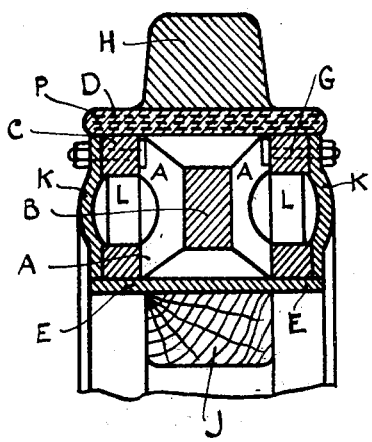
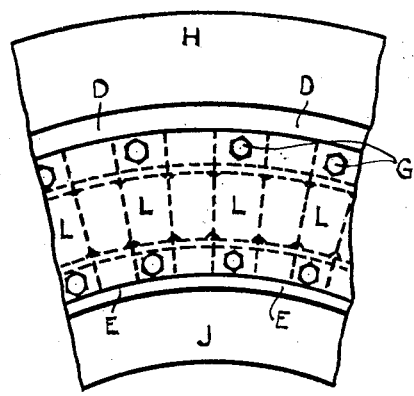

UNITED STATES PATENT OFFICE.

WILLIAM REID, ROBERT HARKNESS REID, AND WILLIAM REID, JR., OF HAMILTON, SCOTLAND.

RESILIENT TIRE FOR WHEELS.

1,404,059.   Specification of Letters Patent.   Patented Jan. 17, 1922.

Application filed March 23, 1921. Serial No. 454,625.

*To all whom it may concern:*

Be it known that we, WILLIAM REID, ROBERT HARKNESS REID, and WILLIAM REID, Jr., all subjects of the King of Great Britain and Ireland, and residents of Burnbank, Hamilton, Scotland, engineers, have invented certain new and useful Resilient Tires for Wheels, of which the following is the specification.

The invention has for its object to provide for vehicle wheels a tire offering effective insulation from road shock.

A tire made according to the invention comprises essentially a rim member preferably flexible, resilient, or deformable, and preferably rubber shod, and in combination therewith and arranged between this rim member and the wheel felloe, or an inner rim, a deformable or elastic member. This deformable member, which is in whole or in part of rubber, is of substantially cruciform cross-section having diagonal arms. That is to say, it comprises a central part from which diverge four diagonal struts. The central part and the strut-like parts may either be continuous or discontinuous. That is to say, these several parts may be continuous webs extending around the whole periphery of the wheel, or any one or more of them may be a series of separate struts, or pieces, severally interconnected into a continuous whole.

The outer ends of the outer diagonal arms of the cruciform member are rigidly anchored to the outer rim member, while the outer ends of the inner diagonal arms are rigidly anchored to the wheel felloe or rim. When these arms are in the form of series or struts, their outer ends may be connected by a continuous ring. In some cases struts of rubber may be arranged between substantially the points of anchorage of the inner and outer arms.

The structure of the cruciform member may be re-enforced by strips or the like of metal, or of textile fabric embedded in or applied to its parts.

In order to exclude dust and moisture, annular coverings of flexible material, for example rubber, may be applied between the rim member and the wheel felloe or rim proper, or the whole wheel may be enclosed between discs of such material.

Figure 1:
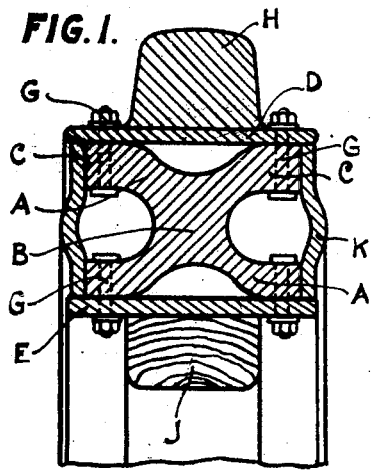
Figure 2:
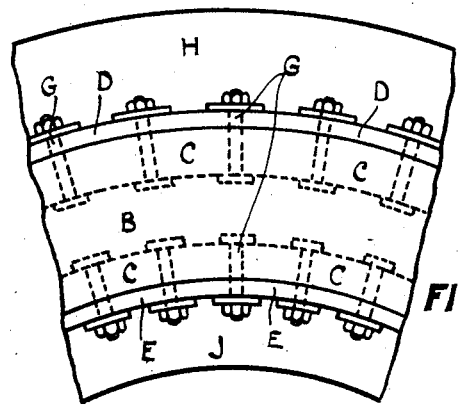
Figure 3:
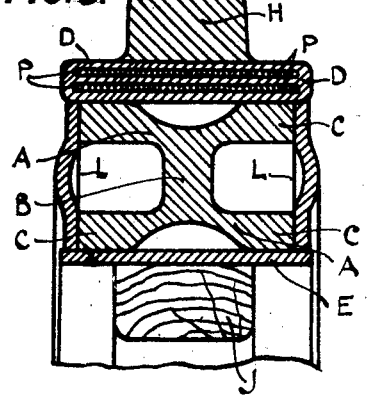
Figure 4:
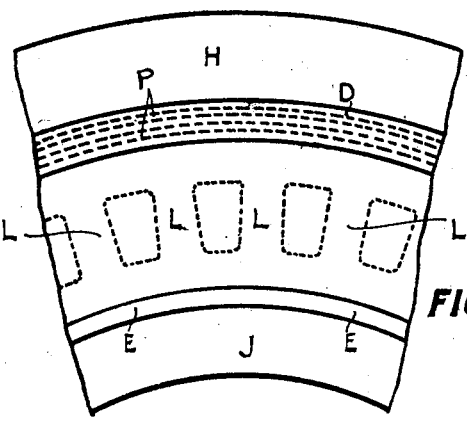
Figure 5:
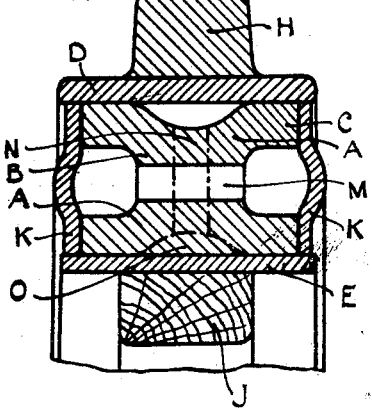
Figure 6:
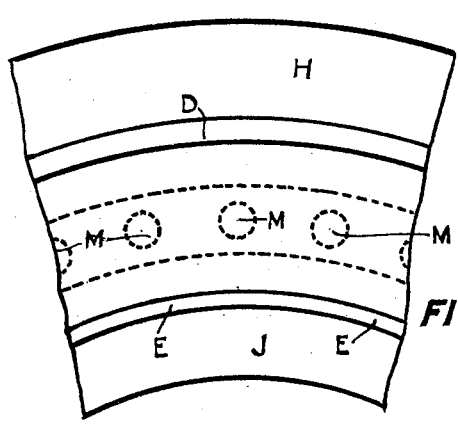

A series of examples of the improved resilient tire is shown on two accompanying sheets of explanatory drawings, Figures 1, 3 and 5, Sheet 1, being transverse sections of three examples, while Figures 2, 4 and 6 are corresponding part side elevations. Figures 7, and 9, Sheet 2, are transverse sections of three further examples, and Figures 9, 10 and 11 respectively, a transverse section, a part side elevation and a plan partly sectional of another example.

It is to be understood that the various sub-integers (as they may be called) such as the form of rim, the method of anchorage, the manner of re-enforcing, are interchangeable throughout the examples which are only given by way of illustration and not as exhaustive of the modification to which the tire may be subject, without departing from the essence of the invention.

The example shown in Figures 1 and 2 is typical of a deformable member of pure cruciform section, the continuous diagonal arms A of which merge in a central continuous member B where they approach one another and in continuous outer parts C by which they are anchored respectively to the outer rim member D and to the inner rim proper E, the means of anchorage being in each case a series of washered bolts G.

In this example the outer rim member D is comparatively inflexible, and upon it there is mounted a solid rubber tire H. The rim proper E is mounted upon the usual felloe J of a wooden wheel. Annular coverings K of flexible material such as rubber are fixed upon the outer faces of the outer parts C for the purpose of excluding dust and moisture.

The example shown in Figures 3 and 4 only differs from that just described in that there is provided between the inner and outer diagonal arms A on each side of the central member a series of radial struts L.

That shown in Figures 5 and 6 again differs from either of the two foregoing examples (with either of which it may be combined) in that a series of transverse apertures M is pierced in the central member B at the base of the arms A. Alternatively, or in addition, there may be similar radial apertures N as indicated by dotted lines in Figure 5. Also, as indicated by dotted lines, a recess O may be formed around the inner periphery.

In the example shown in Figures 3 and 4 the outer rim member D is shown as resiliently built up of a series of strips P which may be of fabric or of a flexible material such as steel, or of a combination of these encased in rubber. In the example shown in Figures 5 and 6 the rim member D is a single element either of rigid or of flexible, resilient, or deformable material.

The example shown in Figure 7 differs from that shown in Figures 1 and 2 in that there is in the central member B an axial aperture R. A tube S may be inserted between the outer part of the member B and a recess formed in the inner part of an outer tire H, as in Figure 8, which tire is formed with integral lateral webs D on which it is carried and which are re-enforced by internal flexible, resilient, or deformable members P near its edges, there being a similar strip T in each of the outer members C. It will be seen that the examples shown in Figure 8 is of the type shown in Figures 3 and 4 and in which there is a series of radial struts L, these struts in the present instances not extending out to the full width of the parts C.

In the example shown in Figures 9, 10, and 11, initially the form is that shown in Figures 2 and 3 but the struts L extend further outwards towards the side of the tire and are wider and are pierced near their junction with the member B by rectangular radial apertures V.

As has already been said, the examples given are by no means exhaustive, and the manner of carrying out the invention may be widely varied without departing from its essence, more particularly in the matter of the manner of anchoring the parts C, the manner of applying and the form of construction of the outer rim member D, the form of the inner rim member E, the type of wheel to which the tire is applied and the details generally.

What we claim is:—

1. In a wheel, a substantially rigid wheel periphery, a rim element surrounding and spaced therefrom, in combination with an interposed resilient cushioning member of substantially cruciform section and comprising a central part spaced from the wheel periphery and rim element, and divergent struts extending outwardly and inwardly therefrom on opposite sides of said central part and in directions at angles to the plane of the wheel, the outer ends of said struts affording outer and inner points of contact and support for said cushioning member with respect to said wheel periphery and surrounding rim elements, substantially as set forth.

2. In the structure set forth in claim 1, discontinuous strut members.

3. In the construction specified in claim 1, a flexible rim element.

In testimony whereof we have signed our names to this specification.

WILLIAM REID.
ROBERT HARKNESS REID.
WILLIAM REID, Junior.